United States Patent
Connell, II et al.

(10) Patent No.: US 11,301,504 B2
(45) Date of Patent: Apr. 12, 2022

(54) POST HOC BIAS COMPENSATION

(71) Applicant: International Business Machines Corporation, Armonk, NY (US)

(72) Inventors: Jonathan Hudson Connell, II, Yorktown Heights, NY (US); Nalini K. Ratha, Yorktown Heights, NY (US); Sharathchandra Pankanti, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 400 days.

(21) Appl. No.: 16/145,596

(22) Filed: Sep. 28, 2018

(65) Prior Publication Data

US 2020/0104380 A1    Apr. 2, 2020

(51) Int. Cl.
*G06F 16/35* (2019.01)
*G06N 20/00* (2019.01)

(52) U.S. Cl.
CPC .......... *G06F 16/355* (2019.01); *G06N 20/00* (2019.01)

(58) Field of Classification Search
CPC ...... G06F 16/355; G06N 20/00; G05B 13/028
USPC .......................................................... 707/736
See application file for complete search history.

(56) References Cited

U.S. PATENT DOCUMENTS

| | | | | |
|---|---|---|---|---|
| 6,456,697 B1 * | 9/2002 | Chang | ..................... | G10L 15/20 379/406.01 |
| 6,480,621 B1 * | 11/2002 | Lyon | ..................... | G06K 9/6256 382/161 |
| 6,760,716 B1 * | 7/2004 | Ganesamoorthi | .... | G05B 13/027 706/14 |
| 8,244,649 B2 * | 8/2012 | Connell | ............... | G05B 13/028 706/45 |
| 8,515,184 B1 * | 8/2013 | Medasani | ............ | G06K 9/6257 706/45 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Hosain T Alam
*Assistant Examiner* — Robert F May
(74) *Attorney, Agent, or Firm* — Peter Edwards, Esq.; McGinn I.P. Law Group, PLLC.

(57) ABSTRACT

A bias compensation method, system, and computer program product include modifying a behavior of a first analytic engine service with a second analytic engine service, where the first service accepts user submitted data and communicates an assessment of the data in a form of a label associated with the corresponding submitted data, where the second service accepts an input and communicates an assessment in a form of a label associated with the corresponding input, and where a behavior model of the first service and the second service includes a discrepancy between the output labels by each service with respect to true labels of data accepted, further including composing a new analytic engine service from the first service and the second service to optimize a service bias in terms of a test dataset based on the behavior model and the known true assessments.

19 Claims, 7 Drawing Sheets

(56) References Cited

U.S. PATENT DOCUMENTS

| | | | | |
|---|---|---|---|---|
| 2007/0135938 A1* | 6/2007 | Subbu | ................ | G05B 13/048 |
| | | | | 700/30 |
| 2011/0040710 A1* | 2/2011 | Connell | ................ | G06N 20/00 |
| | | | | 700/47 |
| 2016/0224803 A1* | 8/2016 | Frank | ................ | G06F 21/6245 |
| 2016/0320768 A1* | 11/2016 | Zhao | ................ | G05B 17/02 |
| 2018/0018576 A1* | 1/2018 | Boyer | ................ | G06N 20/00 |
| 2019/0228006 A1* | 7/2019 | Tormasov | ............. | H04L 9/3239 |
| 2020/0210812 A1* | 7/2020 | Baker | ................ | G06N 3/084 |

OTHER PUBLICATIONS

Authors, et al. IBM; "Conditional Compensatory Multimodal Boosting" An IP.com Prior Art Database Technical Disclosure, IP.com No. IPCOM000188110D, ip.com. Sep. 22, 2009.

Authors, et al. Disclosed Anonymously; "Cascade Deep Learning Model Training for Visual Analytics" An IP.com Prior Art Database Technical Disclosure, IP.com No. IPCOM000245969D, ip.com., Apr. 21, 2016.

Krasanakis, et al. "Adaptive Sensitive Reweighting to Mitigate Bias in Fairness-Aware Classification" Proceedings of the 2018 World Wide Web Conference on World Wide Web, Apr. 2018.

Saberian, et al. "Boosting Classifier Cascades" an, Statistical Visual Computing Laboratory, University of California, San Diego. La Jolla, CA 92039, 2010.

Morstatter, "Discovering Mitigating Social Data Bias" Arizona State University, Aug. 2017.

* cited by examiner

```
┌─────────────────────────────────────────────────┐
│ CORRECTING A BEHAVIOR OF A FIRST ANALYTIC       │── 101
│ ENGINE SERVICE WITH A SECOND ANALYTIC ENGINE    │
│ SERVICE                                         │
└─────────────────────────────────────────────────┘
                         ↓
┌─────────────────────────────────────────────────┐
│ THE FIRST SERVICE ACCEPTS USER SUBMITTED DATA AND│── 102
│ COMMUNICATES AN ASSESSMENT OF THE DATA IN A FORM OF A│
│ LABEL ASSOCIATED WITH THE CORRESPONDING SUBMITTED DATA│
└─────────────────────────────────────────────────┘
                         ↓
┌─────────────────────────────────────────────────┐
│ THE SECOND SERVICE ACCEPTS AN INPUT AND COMMUNICATES AN│── 103
│ ASSESSMENT IN A FORM OF A LABEL ASSOCIATED WITH THE│
│ CORRESPONDING INPUT                             │
└─────────────────────────────────────────────────┘
                         ↓
┌─────────────────────────────────────────────────┐
│ COMPOSING A NEW ANALYTIC ENGINE SERVICE FROM THE FIRST│── 104
│ SERVICE AND THE SECOND SERVICE TO MINIMIZE A SERVICE BIAS IN│
│ TERMS OF TEST DATA SET BASED ON THE BEHAVIOR MODEL AND THE│
│ KNOWN TRUE ASSESSMENTS                          │
└─────────────────────────────────────────────────┘
```

Error rates for baseline network (percent)

| train % | test % | | | | | | | | |
|---|---|---|---|---|---|---|---|---|---|
| | 90 | 80 | 70 | 60 | 50 | 40 | 30 | 20 | 10 |
| 90 | 2.52 | 3.43 | 4.14 | 5.05 | 5.82 | 6.57 | 7.42 | 8.45 | 9.01 |
| 80 | 2.49 | 3.44 | 4.17 | 5.07 | 5.91 | 6.65 | 7.53 | 8.39 | 9.00 |
| 70 | 5.58 | 5.52 | 5.46 | 5.30 | 5.24 | 5.17 | 5.21 | 5.32 | 5.28 |
| 60 | 3.20 | 3.70 | 4.07 | 4.49 | 4.97 | 5.35 | 5.82 | 6.35 | 6.63 |
| 50 | 4.00 | 4.10 | 4.01 | 4.05 | 4.16 | 4.22 | 4.23 | 4.36 | 4.17 |
| 40 | 6.01 | 5.70 | 5.22 | 4.83 | 4.47 | 4.04 | 3.63 | 3.26 | 2.76 |
| 30 | 5.66 | 5.34 | 4.81 | 4.44 | 4.19 | 3.73 | 3.29 | 2.92 | 2.45 |
| 20 | 7.53 | 6.96 | 6.34 | 5.83 | 5.38 | 4.68 | 4.07 | 3.46 | 2.75 |
| 10 | 22.11 | 19.75 | 17.62 | 15.26 | 13.24 | 11.02 | 8.65 | 6.42 | 4.03 |

FIG. 5

Falloff

POST HOC BIAS COMPENSATION

BACKGROUND

The present invention relates generally to a bias compensation method, and more particularly, but not by way of limitation, to a system, method, and computer program product to tacking a "compensator" onto an output of a main classifier to help the classifier perform better on a sample set with a particular distribution of classes.

Machine learning models, including the deep learning paradigm, involve a training phase and subsequent inferencing or prediction phase. The inferencing happens in the real world with more widely varying conditions than the training, where the data is limited. Hence, the conditions in which a learning-model-based system gets used may differ significantly from the conditions in which the system was developed. As the end use environment is often not known apriori, there are practical difficulties of matching the deployment scenario to the training environment. Conventional machine learning methods pay little attention to this mismatch by typically ignoring any differences.

The present invention has evolved from a recognition that since there is a high likelihood that something would have changed in a model between training and test data sets, there is a need for a technique that can compensate for an expected shift in the data in post-processing.

SUMMARY

In an exemplary embodiment, the present invention provides a computer-implemented bias compensation method, the method including modifying a behavior of a first analytic engine service with a second analytic engine service, where the first service accepts user submitted data and communicates an assessment of the data in a form of a label associated with the corresponding submitted data, where the second service accepts an input and communicates an assessment in a form of a label associated with the corresponding input, and where a behavior model of the first service and the second service includes a discrepancy between the output labels by each service with respect to true labels of data accepted, the method further including composing a new analytic engine service from the first service and the second service to optimize a service bias in terms of a test dataset based on the behavior model and the known true assessments. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
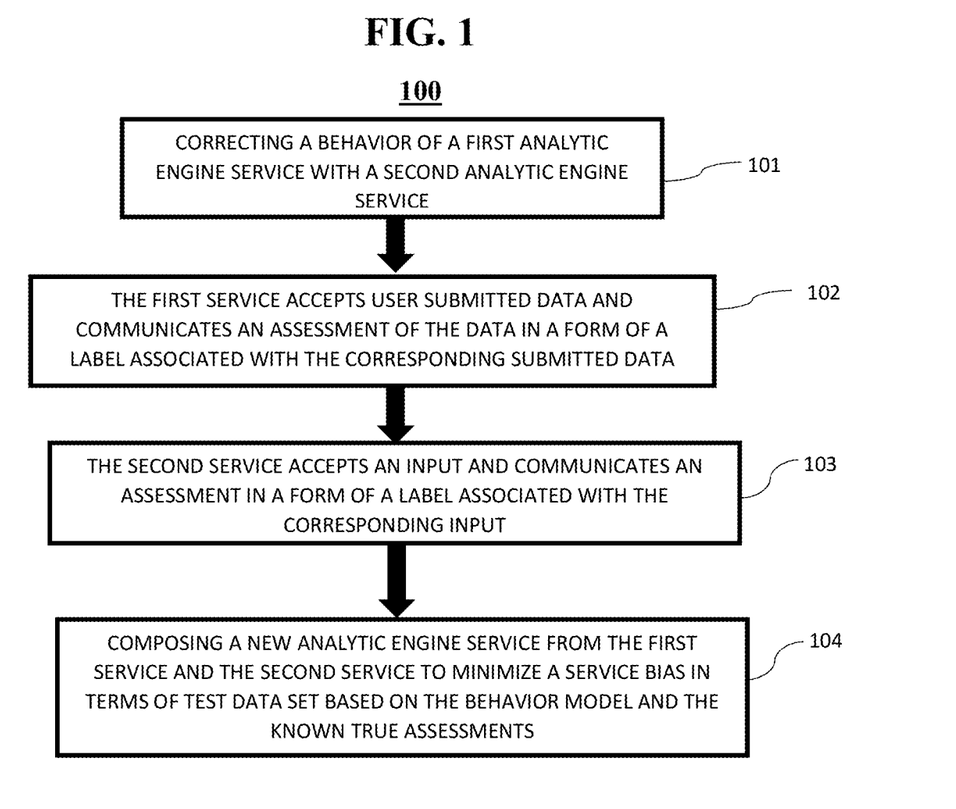
FIG. 1 exemplarily shows a high-level flow chart for a bias compensation method 100 according to an embodiment of the present invention.

By way of introduction of the example depicted in FIG. 1, an embodiment of a bias compensation method 100 according to the present invention can include various steps for providing a compensator for an unknown training distribution and tune the classifier to the test distribution.

Figure 7:
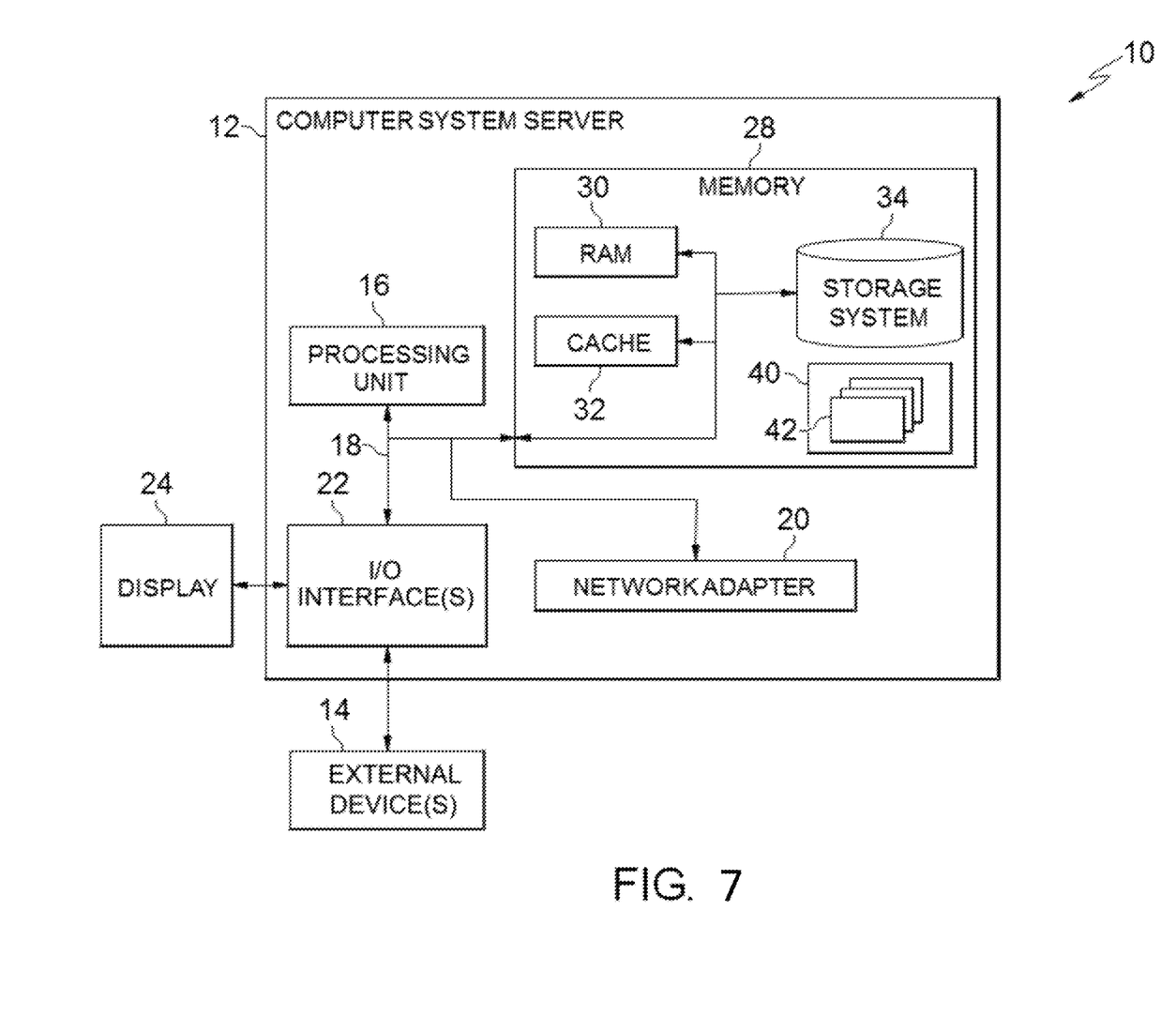
FIG. 7 depicts a cloud-computing node 10 according to an embodiment of the present invention.

By way of introduction of the example depicted in FIG. 7, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 9), it is nonetheless understood that the present invention can be implemented outside of the cloud environment.

Referring to FIG. 1, the method 100 facilitates composing an overall new service from the two services to minimize (e.g., optimize) overall service bias in terms of a test data set with known true assessments.

It is noted that type classification from images is exemplarily used to explain the present invention since this exemplary application demonstrates how accuracy in type prediction (e.g., whether an image is a cat or a dog) varies with the skew between the training data and test data and to show a mitigation step, whereby the unknown bias of such a "black box" service can be alleviated. In essence, and as a summary of the problem being addressed by the present invention, if the classifier is unsure about some sample it can use the prior probabilities of the classes to tip the balance.

That is, with regard to the invention, a prior probability shift is modeled with a controlled sample selection bias to create imbalanced data to study the outcome. This method does not explicitly model the distribution and/or the covariates underlying the data. Domain shift and/or source component shift are also not considered. Thus, transfer learning based on the present invention is not being studied as limiting the work in the space of dataset shift. In addition, it is assumed that the test data and training data are from an underlying distribution, which is not changing over time.

Additionally, the present invention presents accuracy to be corrected (e.g., modified) using a compensation method. Specifically, in the exemplary application of animal type recognition, given a set of images with their type labels (e.g., a cat or a dog), one may train a multi-layer network to predict the type from a deep embedding of the image. Given a new unknown image, one may now predict the type by first computing the deep embedding of the unknown images and then submitting it to a multi-layer classifier network. Even though the goal is not to produce the best type classifier, the performance of the present invention is comparable to the state-of-the art.

Desirably, in the invention, the training images and test images come from a type image dataset which contains images of different types of cats and dogs crawled from the web. With the disclosed approach, not only may one compensate for an unknown training distribution but also, even for standard balanced training, one may better tune the classifier to the test distribution. Again, while the proposed mitigation method is demonstrated using type estimation from type images, the method of the present invention can be applied to other classifier systems as well and are not limited thereto. That is, for example, the invention can be applied to face images, type images, or any set of images that has different entities in the images (e.g., male/female, cat/dog, cow/pig, rice/wheat, car/truck, etc.).

Figure 2:
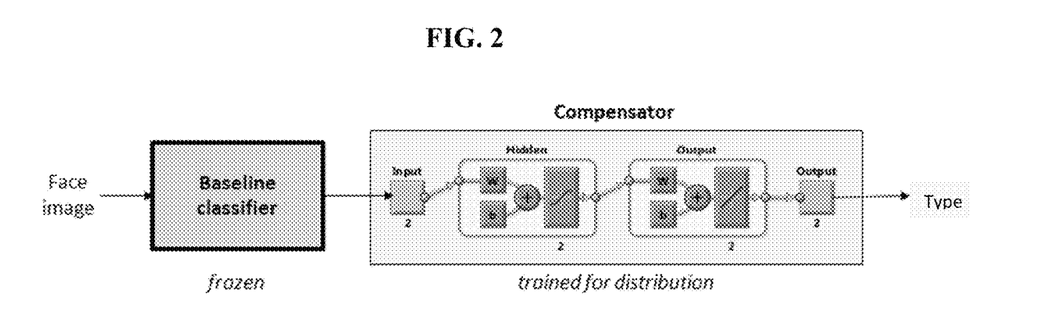
FIG. 2 exemplarily depicts a trained compensator network in series with an N-output classifier that can improve performance for an application such as a type determination from images according to an embodiment of the present invention.

With reference generally to FIGS. 1 and 2, a method is disclosed of tacking a "compensator" onto the output of a main classifier, to help it perform better on a sample set with a particular distribution of classes (e.g., a particular number of cats and dogs). The compensator is constructed using a relatively small set of samples having a distribution matching that anticipated in the deployment domain. In general, the method is applied to a main "frozen" N-class classifier, which has N real-valued outputs, one for each class. The class associated with the maximum of these values is taken to be the answer, assuming a forced choice scenario. The theory underlying the present invention is that the magnitudes of these N values implicitly encode information about the confidence of the classifier.

FIG. 2 exemplarily explains that adding a specially trained compensator network in series with an N-output classifier can improve performance for an application such as type determination from type images. That is, suppose the task is type assessment from an image, as shown in FIG. 2, and the neural net classifier has two outputs, O1 for dog and O2 for cat. These have a graded response, but the maximum of the two outputs is taken to generate a "crisp" answer of either D or C (i.e., if O2>O1 then report C for cat). And, assuming that $f_1(O_1)$ and $f1(O_2)$ are functions of the probability of emitting a certain label (D or C). Although not generally true about the raw output of neural nets, this can be accomplished by applying a logistic regression function to each output. That is, one may pass a modest "adaptation" set of labeled data (which, importantly, reflects the expected distribution of the test data) through the main classifier and declare that an output has "won" the competition if it has the highest value. In this way, the scalar values at the original outputs can be turned into probabilities, not of the correct classification, but of emitting a particular label (D or C).

With the above interpretation, one can write:

"$f_1(O_1)$=P(D)=P(D|dog)P(dog)+P(D|cat)P(cat)=T $PR_1$Ptrain(dog)+C $PR_1$Ptrain(cat)" and "$f_2(O_2)$= P(C)=P(C|dog)P(dog)+P(C|cat)P(cat)=T $PR_2$Ptrain (dog)+C $PR_2$Ptrain(cat)", where, the T $PR_1$, T $PR_2$, C $PR_1$, and C $PR_2$ are error rates that come from the empirical confusion matrix for a particular set of examples after the outputs have been "crispened".

As before, this needs to be done with an adaptation set of examples whose distribution matches those of the expected test data (e.g., the same set as was used for logistic regression). The error rates essentially factor out from the unknown priors of the training set, Ptrain(dog) and Ptrain(cat).

Although one can write tidy equations as above, neural networks in general are not so cleanly separable and actually have the priors of the training set baked into them. They are optimized to make the best guess possible for each example in the training set. Given a pre-trained network, it is more desired to know what the probability that a new unknown example is dog (or cat). This can be written as below, where the probability of a certain label (D or C) is taken as a function of the raw value of the corresponding output of the originally trained network:

$$P(\text{dog}) = P(\text{dog} | D)P(D) + P(\text{dog} | F)P(C)$$
$$= P(\text{dog} | M)f_1(O_1) + P(\text{dog} | F)f_2(O_2)$$
$$= \omega_{11} f_1(O_1) + \omega_{12} f_2(O_2)$$

Thus, the answer is a weighted sum of the two raw outputs. Expanding the first of these weights one finds that it is based on the empirical error rates from the training set and the priors of the testing set which is:

$$\omega_{11} = P(\text{dog} | D)$$
$$= \frac{P(D | \text{dog})P(\text{dog})}{P(D | \text{dog})P(\text{dog}) + P(D | \text{cat})P(\text{cat})}$$
$$= \left(1 + \frac{P(D | \text{cat})P(\text{cat})}{p(\text{dog})} P(D | \text{dog})^{-1}\right)$$
$$= \left(1 + \frac{FPR_1}{TPR_1} \frac{P_{test}(\text{cat})}{P_{test}(\text{dog})}\right)^{-1}$$

And, a similar derivation gives the equivalent weight terms $w_{12}$, $w_{21}$, and $w_{22}$. Overall, the final solution can be written as below, which is just two non-linear corrections followed by a 2×2 matrix multiply:

$$O_1 = P(\text{dog}) = w_{11} f_1(O_1) + w_{12} f_2(O_2)$$

$$O_2 = P(\text{cat}) = w_{21} f_1(O_1) + w_{22} f_2(O_2)$$

Instead of implementing these operations explicitly, the invention uses a 3-layer fully connected neural network with a sigmoidal transfer function. One then trains this compensator network with the ground truth for a modest set of samples whose distribution matches that of the overall test set. Conveniently, since the compensator has such a small number of weights, one does not require a particularly large adaptation set. One only needs to make sure that there will be enough errors to drive the learning. The final improved output is generated by cascading the original frozen network as output through this special-built compensator module.

Figure 3:
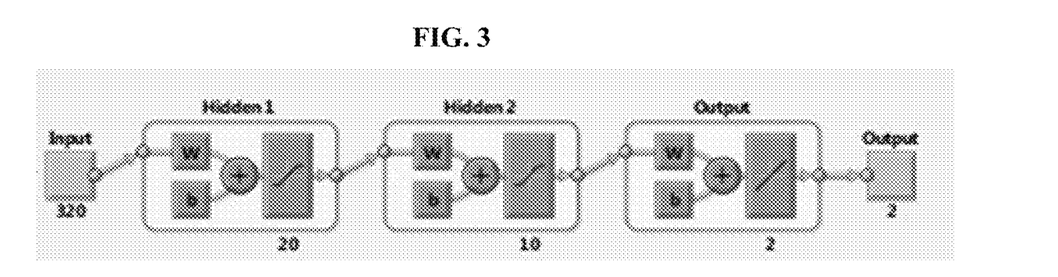
FIG. 3 exemplarily depicts a baseline classifier network that takes element embeddings from of an image to produce a dog and a cat type outputs according to an embodiment of the present invention.

With reference to FIG. 3, the invention is exemplary explained using type determination based on type images. One exemplary database has crawled the web to generate a large database of type images. This database collection has 167,888 images covering 8,277 different types of cats and dogs. A 320-element vector embedding for each image is provided, which was produced in the context of a recognition task. One uses these features as the input to a 320:20: 10:2 fully connected network with sigmoidal discontinuities, as shown in FIG. 3, to predict the type of the animal in each image. The network has dual outputs (D and C) instead of a single one in order to better retain any uncertainty in the classification result. The output having the maximal value is presumed to be the decision of the network.

To obtain training data for this network, the invention uses subsets of the database. In addition to the vector embedding, the database also provides a separate feature called 'dogness' which correlates well with the type of the animal in the picture. This is used as a ground truth for the images (e.g., a 'biased test set label'). One starts with just the first third of the entire collection (e.g., 2,759 unique animals) and then partition it into presumed dogs and cats by thresholding the 'dogness' feature at 0.5 (i.e., dog if >0.5, cat otherwise). Of course, this labeling may not be totally correct, which has implications for both the training and testing of the resulting system. The important point is that each sample image has been given some particular target label (D/C as associated input data).

Next, for each type partition, the number of unique identities are determined and are randomly assigned two thirds to a training pool and one third to a testing pool. This is done because the 320-element vector has been demonstrated as being strong enough to identify individuals and it was not intended for the network to simply remember the type of each animal. Finally, one can sort the type images by sample number, that is "image 1 of grey cat", "image 1 of golden dog", "image 1 of black lab", . . . , "image 2 of a pug", etc. This prevents a cat breed or a dog breed with many images in the database from dominating the beginning of the list. Then, to generate a requested subset of size N, one uses samples 1 through N of the ordered list. Note that if a list of 2000 samples is generated, this will automatically include every sample that was part of a previous list of 1000.

To train one variant of the baseline network, the invention generates a set of 20,000 samples with a known distribution. For instance, for a 70% dog training set, the first 14,000 samples are chosen from the dog training pool (e.g., multiple pictures of different dogs) and the remaining 6,000 samples from the cat training pool (e.g., multiple pictures of different cats). The training is done via, for example, Matlab® using Levenberg-Marquardt optimization and run for a fixed five epochs. This is repeated for each of the nine variants. For the testing set, a set of 10,000 samples are assembled in a manner similar to that formal training. For example, to build the 30% dog test set, a first 3,000 samples are taken from the dog testing pool and the remaining 7,000 samples from the cat testing pool. In total, nine different test sets are generated with which to test the nine variants of the network.

Figure 4:
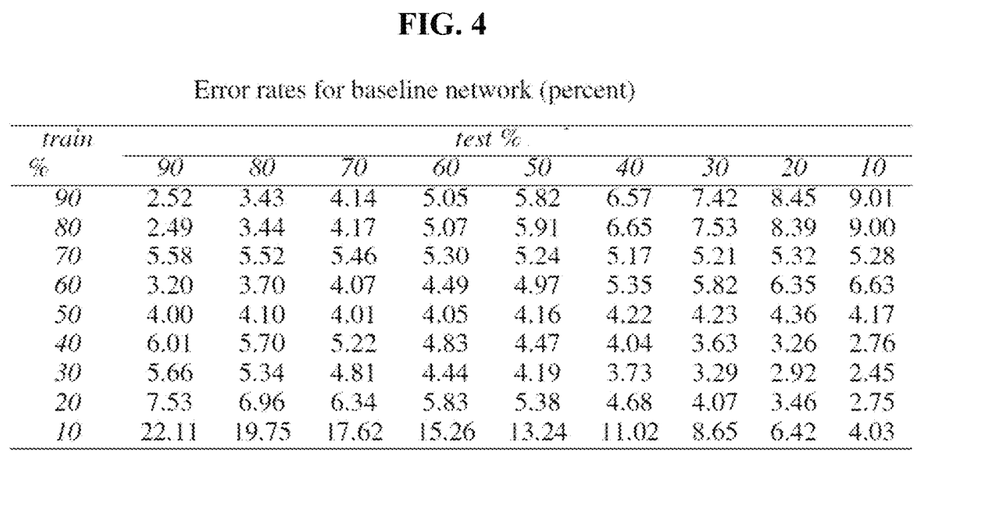
FIG. 4 exemplarily depicts error rates for a baseline network (in percent) according to an embodiment of the present invention.

FIG. 4 exemplarily depicts the results of the method of the invention as applied to the type recognition example, where the error is expressed as a percentage. The rows are the nine network variants, while the columns are the nine different test sets. Note that our goal here is not to make the best type classification system possible, but rather provide a testbed for experimenting with compensators. Yet, from the table one can see that for balanced training (50% dog) the error is 4.16% (416 mistakes) when tested with a balanced test set (50% dog). This is comparable to state-of-the-art results for type determination, so the 320:20:10:2 network is not an artificially weak strawman. However, note that if the network was trained with 80% dog and tested with 80% cat (20% dog), the error climbs to 8.39% (more than twice the mistakes).

Figure 5:
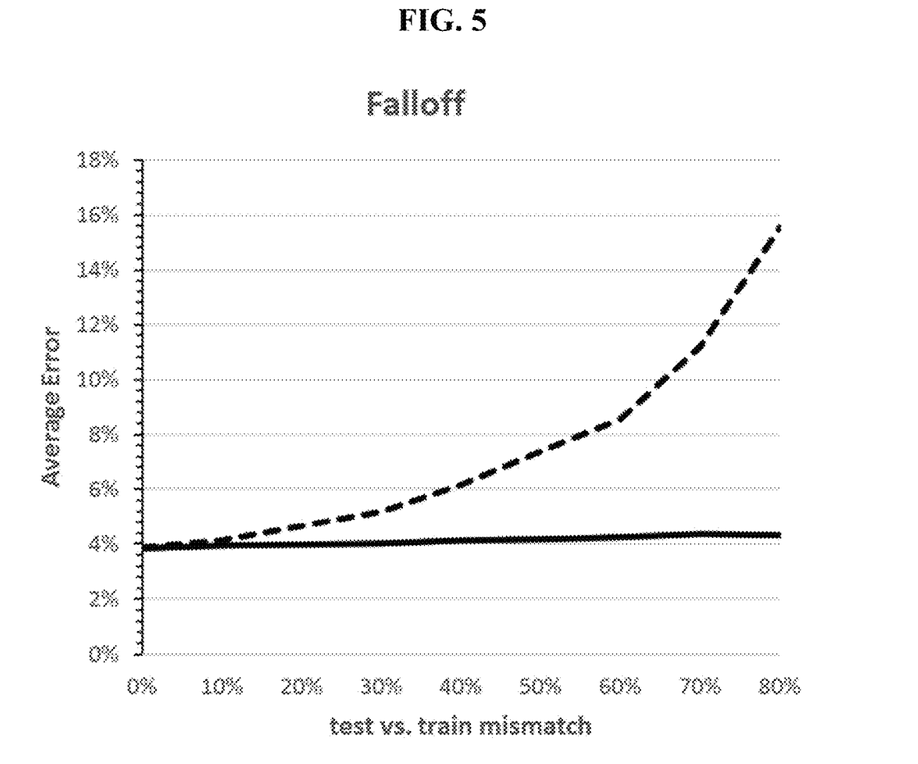
FIG. 5 exemplarily depicts the average error for various degrees of mismatch between the training and testing distributions according to an embodiment of the present invention.

In general, as shown in FIG. 4, the entries on the major diagonal (matched training and testing) are noticeably better than the values in the upper right or lower left corners (highest mismatch). FIG. 5 shows the average error (dashed line) for various degrees of mismatch. For instance, training on 70% dog and testing on 50% dog has a mismatch of 20%, as does training on 40% dog and testing on 60% dog. The averages in FIG. 5 come from bands parallel to the main diagonal, but offset by varying amounts. One important note is that the average error rises as the mismatch increases. The purpose of the compensator in the invention is to flatten this curve and, indeed, the invention generates a curve (solid line) with much less falloff in accuracy.

As described above, the chosen compensator architecture is a 2:2:2 fully connected neural net with sigmoidal discontinuities. For each baseline network variant, a separate compensator is trained for each known test distribution. To do this, an adaptation set is constructed of 1,000 samples (e.g., 1,000 D/C data points) that matches the distribution of the main testing set. Since the testing only used a maximum of 18,000 samples from each original training pool with the D/C samples, the adaptation set is selected from the remaining unseen 2,000 examples. That is, the adaptation samples for the compensator are completely disjoint from the training samples for the baseline network. They are also distinct from any samples in the testing pools (by design). Note that, in practice, the actual details of the test distribution do not need to be explicitly known; a random sampling of test cases is sufficient.

To form the input for each compensator, the adaptation samples are processed through a particular selected variant of the 320:20:10:2 network to generate two values. Then Matlab® is used with Levenberg-Marquardt optimization and run for ten epochs.

Figure 6:
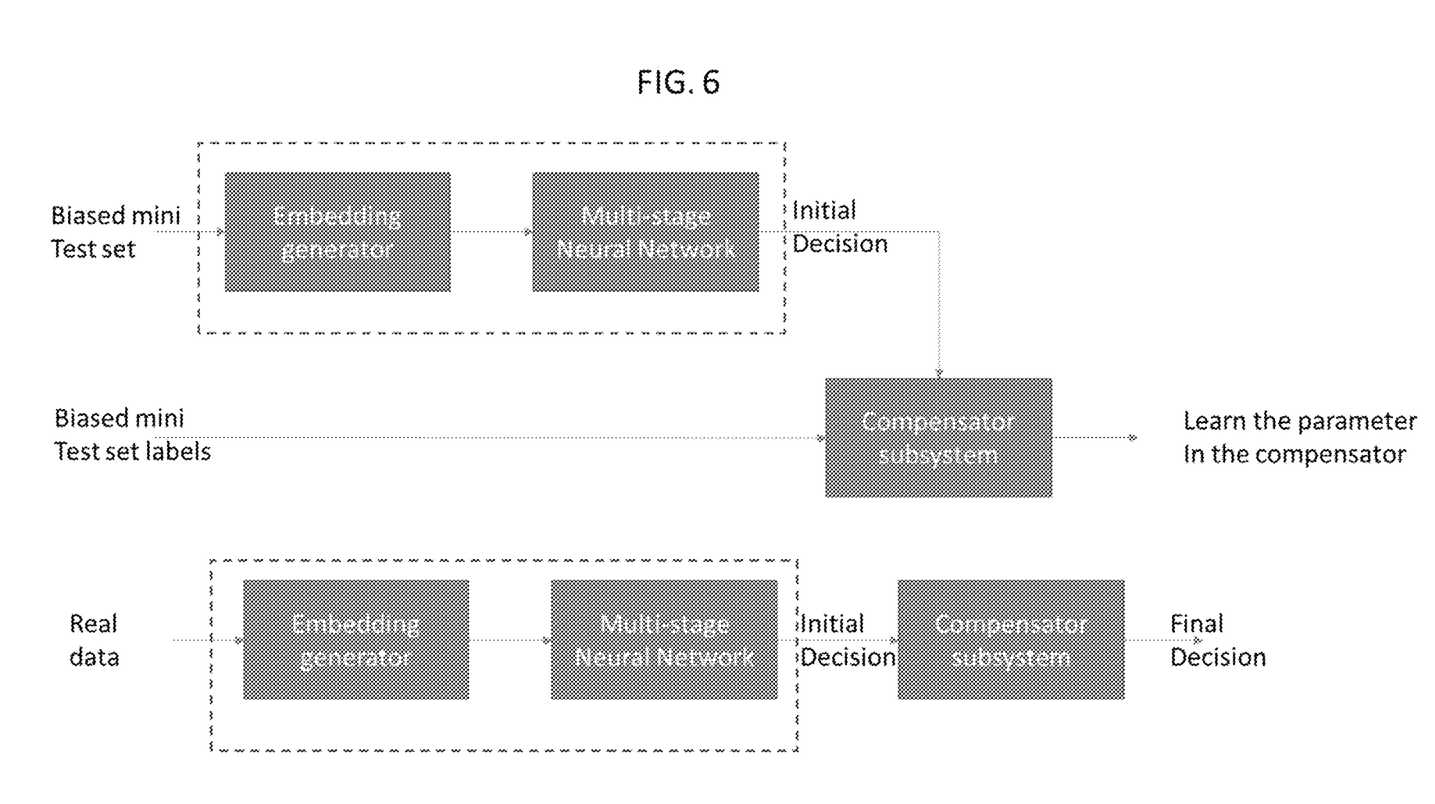
FIG. 6 exemplarily depicts a training and execution of the compensator according to an embodiment of the present invention.

FIG. 6 generally depicts an overall architecture for the invention. The compensator subsystem is trained from a set of data (e.g., 1,000 D/C samples as above) with labels known of the mini test set. The embedding generator and multi-stage neural network are "frozen". That is, a "frozen" N-class classifier which has N real-valued outputs, one for each class. The class associated with the maximum of these values is taken to be the answer, assuming a forced choice scenario. The mini test set of labeled data having the desired distribution is first passed through the main classifier to generate a vector of N values, which then forms the input for the compensator network. For each sample, the training target of the compensator is a vector with a one on the appropriate class output and zeroes elsewhere. After training, the compensator network is also frozen and the final (full) classifier is the cascade of the main classifier followed by the compensator (e.g., used for real data). As with the original setup, the output with the maximal value is taken to be the answer when new samples are pumped through the combined system.

In another embodiment, the compensator is formed by first applying a logistic function to each original output, then multiplying by an N×N correction matrix to give the final output. The correction matrix is formed by running a modest set of labeled data through the main classifier to generate a confusion matrix. The error rates in this matrix, along with the known prior probability distribution of the labeled data, are combined to generate the correction matrix entries.

The logistic regression is necessary since the correction matrix described above was derived from probability theory. The regression is performed by passing a modest set of labeled data (which can be the same as that used for the confusion matrix) through the main classifier and declaring that an output has "won" the competition if it has the highest value. In this way, the scalar values at the original outputs can be turned into probabilities. However, if the main classifier is a neural net that has been trained with a "one on" target output, this step may not be strictly necessary.

It is noted that the correction subsystems may include a multi-layer perception, a perception and non-linearity model, a repressor and matrix multiplication, and a Support Vector Machine (SVM).

While these methods may not generate a composite classifier that is as accurate as could be obtained by retraining the whole thing, they do provide a method for customizing a "black box" for an application in a way that improves its performance.

That is, the architecture of FIG. 6 may receive an N-class classifier with N real-valued outputs, detect bias in the classifier based on a statistical aggregation of discrepancies between classifier output and ground truth, use the classifier to determine a vector of N values based on a sample of labeled data, train a compensator model based on the vector, and mitigating the bias in the classifier by cascading classifications through the classifier and then the compensator model.

With reference now to FIG. 1 and the method 100, in step 101, a behavior of a first analytic engine service is corrected with a second analytic engine service.

In step 102, the first service accepts user submitted data and communicates an assessment of the data in a form of a label associated with the corresponding submitted data.

In step 103, the second service accepts an input and communicates an assessment in a form of a label associated with the corresponding input. And, a behavior model of the first service and the second service includes a discrepancy between the outputs labels by each service with respect to true labels of data accepted.

In step 104, a new analytic engine service is composed from the first service and the second service to minimize a service bias in terms of a test dataset based on the behavior model and the known true assessments.

In one embodiment, the service bias is measured by a statistical aggregation of discrepancies between the true labels to two or more inputs and their corresponding service responded labels. Also, the second service can further accept at least the output of the first service and communicates an overall output including the first service output and the second service output, the new service input includes the input to the first service and the overall output, the new service behavior model is characterized by bias in the output of the second service with respect to the data that has been input to the first service, and the second service is configured to compensate the bias of the first service such that the service bias is minimized.

In another embodiment, test dataset can be identified with verified correct labels associated with each datum in the test dataset, the test dataset being split into two or more sub-test datasets, each sub-test dataset including a unique proportion of test-data associated with a given label, and each sub-test dataset is passed on to the new service to receive a service analytic answer for each data in each sub-test dataset. The sub-test service behavior of the new service is based on discrepancies between the true data labels and the corresponding service responded labels and an overall behavior of the new service from the test is determined from the collection of the sub-test service behaviors.

In another exemplary embodiment, bias of the first service, the second service, and the new service is measured with respect to the identified test dataset with known true assessments. In addition, the second service is configured so that bias of the second service compensates for bias in the first service so that the new service bias is minimized. And, a configuration of second service is machine learnt.

Thus, the invention may leverage machine learning techniques to both detect and compensate for the bias in service to use test data set to wrap a given service (with unknown bias) to provide a new service which is exactly the same as the original service but without bias, as statistically measured in terms of the test data set.

It is noted that the system can include a detection as a service. That is, a system and method of modeling behavior of an analytic engine service can be included in which the service comprises of accepting of the user submitted data and communicating its assessment (decision) to the user in the form of two or more labels, and a method for characterizing the service behavior model in terms of its bias. The service bias is measured in terms of the statistical aggregation of discrepancies between the true data labels to two or more inputs and their corresponding service responded labels. And, the method can include a technique of identifying test dataset with verified correct labels associated with each datum in the test dataset, the dataset split into two or more sub-test datasets, each sub-test dataset consisting of a unique proportion of test-data associated with a given label, each sub-test dataset submitted to the service engine to receive the service analytic assessment for each data in each sub-test dataset, the sub-test service behavior characterized in terms of the discrepancies between the true data labels and the corresponding service responded labels, and the overall service bias assessed in terms of the collection of the individual sub-test service behaviors.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 7, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 8:
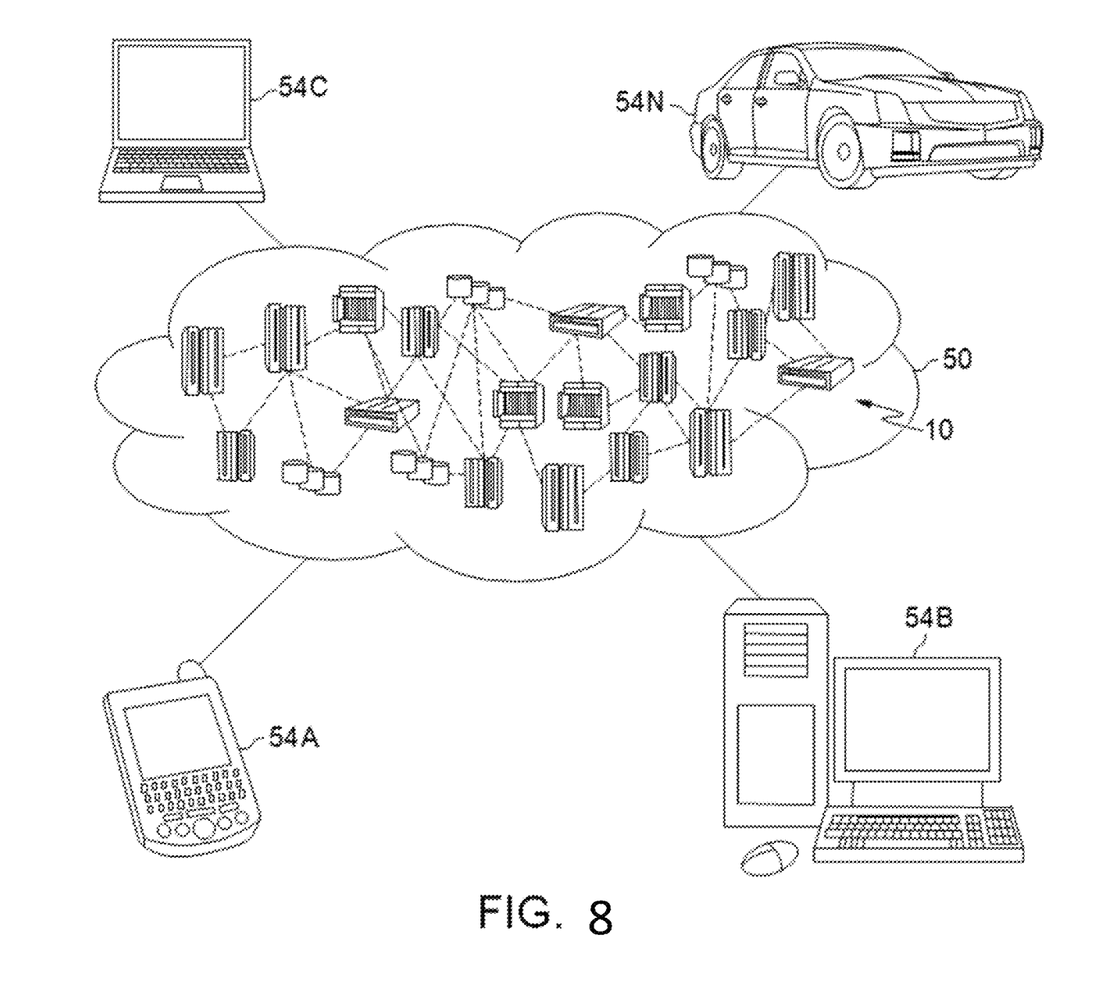
FIG. 8 depicts a cloud-computing environment 50 according to an embodiment of the present invention.

Referring now to FIG. 8, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Figure 9:
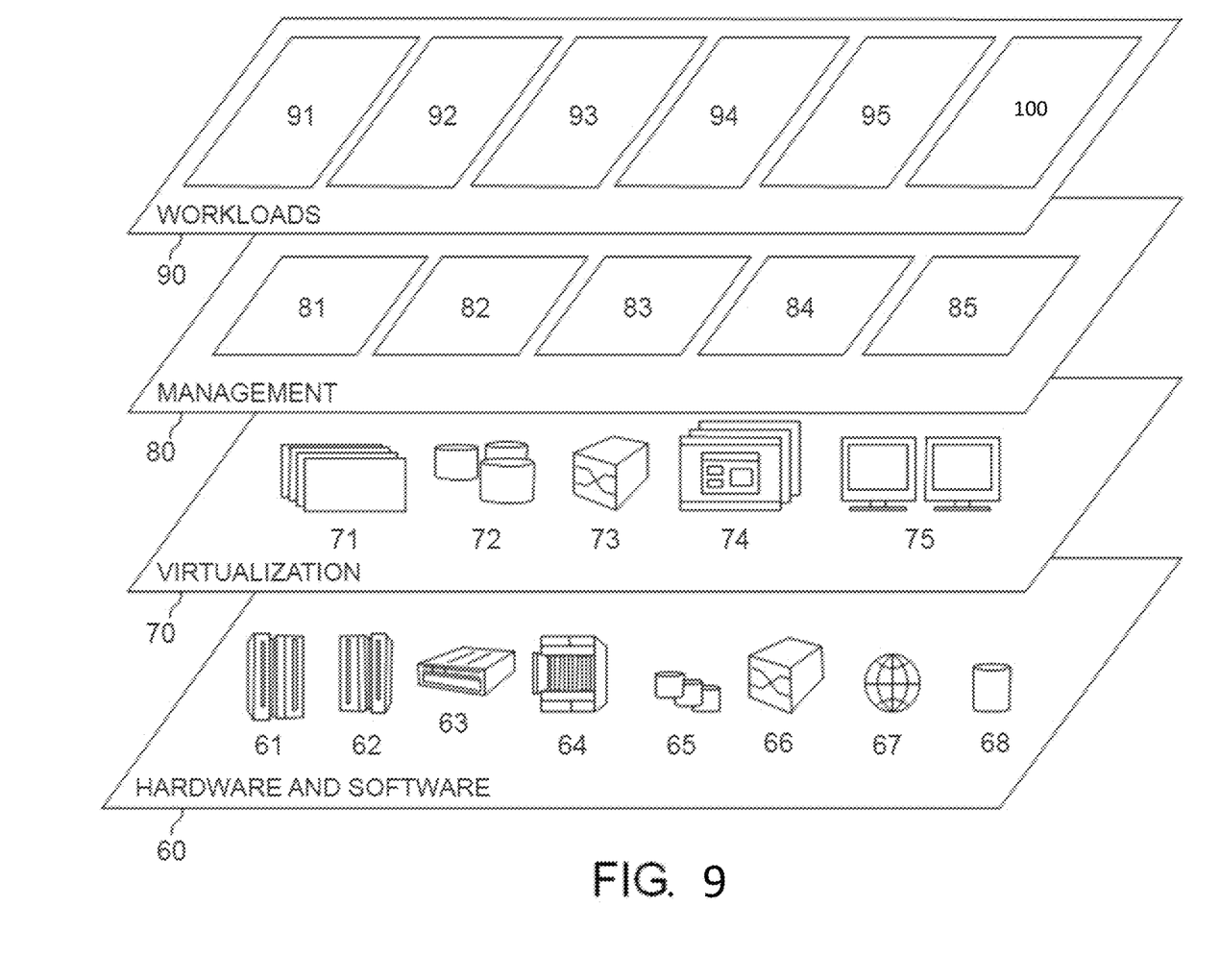
FIG. 9 depicts abstraction model layers according to an embodiment of the present invention.

Referring now to FIG. 9, an exemplary set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and bias compensation method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented bias compensation method, the method comprising:
   modifying a behavior of a first analytic engine service with a second analytic engine service,
   wherein the first analytic engine service accepts user-submitted data and communicates as a first output an assessment of the user-submitted data in a form of a first label associated with the corresponding user-submitted data,
   wherein the second analytic engine service accepts an input and communicates as a second output an assessment of the input in a form of a second label associated with the corresponding input, and
   wherein a behavior model calculates bias of the first analytic engine service and the second analytic engine service, and
   wherein the bias is represented as a statistical aggregation of discrepancies between the first output and a ground truth and between the second output and the ground truth,
   the method further comprising:
   composing a new analytic engine service from the first analytic engine service and the second analytic engine service to optimize a service bias in terms of a test dataset based on the behavior model, the detected bias, and known true assessments, the new analytic engine service determining a vector of N-values based on a sample of the first label and the second label and training a compensator model to optimize the service bias on the vector; and
   mitigating the bias within the new analytic engine service by cascading classifications through the new analytic engine service and then the compensator model.

2. The computer-implemented method of claim 1, wherein the second analytic engine service further accepts at least an output of the first analytic engine service and communicates an overall output including the first output of the first analytic engine service and the second output of the second analytic engine service, and
   wherein a new service input comprises the input to the first analytic engine service and the overall output,
   wherein a new service behavior model is characterized by a bias in the output of the second analytic engine service with respect to the user-submitted data that has been input to the first analytic engine service, and
   wherein the second analytic engine service is configured to compensate the detected bias of the first analytic engine service such that the service bias is optimized.

3. The computer-implemented method of claim 1, further comprising:
   identifying the test dataset with verified correct labels associated with each datum in the test dataset, the test dataset being split into two or more sub-test datasets, each sub-test dataset including a unique proportion of test-data associated with a given label; and
   passing each sub-test dataset on to a new service to receive a service analytic answer for each data in each sub-test dataset,
   wherein a sub-test service behavior of the new service is based on discrepancies between the true data labels and corresponding service responded labels, and
   wherein an overall behavior of the new service from the test dataset is determined from a collection of the sub-test service behaviors.

4. The computer-implemented method of claim 3, wherein bias is measured with respect to the identified test dataset with known true assessments of each of:
   the first analytic engine service;
   the second analytic engine service; and
   a new service.

5. The computer-implemented method of claim 4, wherein the second analytic engine service is configured so that the detected bias of the second analytic engine service compensates for the bias in the first analytic engine service so that a bias of the new service is optimized.

6. The computer-implemented method of claim 5, wherein a configuration of the second analytic engine service is machine learnt.

7. The computer-implemented method of claim 1, wherein the first analytic engine service was trained with all of an available unbalanced data and a new service provides compensation for an unbalance in the available unbalanced data while still making use of all the user-submitted data.

8. The computer-implemented method of claim 1, wherein a detection comprises a service that is used two or more times to account for a time variance in a distribution of the test dataset.

9. The computer-implemented method of claim 1, embodied in a cloud-computing environment.

10. A computer program product for bias compensation, the computer program product comprising a computer-readable storage medium having program instructions embodied therewith, the program instructions executable by a computer to cause the computer to perform:
    modifying a behavior of a first analytic engine service with a second analytic engine service,
    wherein the first analytic engine service accepts user-submitted data and communicates as a first output an assessment of the user-submitted data in a form of a first label associated with the corresponding user-submitted data,
    wherein the second analytic engine service accepts an input and communicates as a second output an assessment of the input in a form of a second label associated with the corresponding input, and
    wherein a behavior model calculates bias of the first analytic engine service and the second analytic engine service, and
    wherein the bias is represented as a statistical aggregation of discrepancies between the first output and a ground truth and between the second output and the ground truth,
    further comprising:
    composing a new analytic engine service from the first analytic engine service and the second analytic engine service to optimize a service bias in terms of a test dataset based on the behavior model, the detected bias, and known true assessments, the new analytic engine service determining a vector of N-values based on a sample of the first label and the second label and training a compensator model to optimize the service bias on the vector; and
    mitigating the bias within the new analytic engine service by cascading classifications through the new analytic engine service and then the compensator model.

11. The computer program product of claim 10, wherein the second analytic engine service further accepts at least an output of the first analytic engine service and communicates an overall output including the first output of the first analytic engine service and the second output of the second analytic engine service, and wherein a new service input comprises the input to the first analytic engine service and the overall output, wherein a new service behavior model is characterized by a bias in the output of the second analytic engine service with respect to the user-submitted data that has been input to the first analytic engine service, and wherein the second analytic engine service is configured to compensate the detected bias of the first analytic engine service such that the service bias is optimized.

12. The computer program product of claim 10, further comprising:

identifying the test dataset with verified correct labels associated with each datum in the test dataset, the test dataset being split into two or more sub-test datasets, each sub-test dataset including a unique proportion of test-data associated with a given label; and passing each sub-test dataset on to a new service to receive a service analytic answer for each data in each sub-test dataset, wherein a sub-test service behavior of the new service is based on discrepancies between the true data labels and corresponding service responded labels, and wherein an overall behavior of the new service from the test dataset is determined from a collection of the sub-test service behaviors.

13. The computer program product of claim 12, wherein bias is measured with respect to the identified test dataset with known true assessments of each of:

the first analytic engine service;
the second analytic engine service; and
a new service.

14. The computer program product of claim 13, wherein the second analytic engine service is configured so that the detected bias of the second analytic engine service compensates for the bias in the first analytic engine service so that a bias of the new service is optimized.

15. The computer program product of claim 14, wherein a configuration of the second analytic engine service is machine learnt.

16. A bias compensation system, the system comprising:
a processor; and
a memory, the memory storing instructions to cause the processor to perform:

modifying a behavior of a first analytic engine service with a second analytic engine service, wherein the first analytic engine service accepts user-submitted data and communicates as a first output an assessment of the user-submitted data in a form of a first label associated with the corresponding user-submitted data, wherein the second analytic engine service accepts an input and communicates as a second output an assessment of the input in a form of a second label associated with the corresponding input, and wherein a behavior model calculates bias of the first analytic engine service and the second analytic engine service, and wherein the bias is represented as a statistical aggregation of discrepancies between the first output and a ground truth and between the second output and the ground truth, further comprising:

composing a new analytic engine service from the first analytic engine service and the second analytic engine service to optimize a service bias in terms of a test dataset based on the behavior model, the detected bias, and known true assessments, the new analytic engine service determining a vector of N-values based on a sample of the first label and the second label and training a compensator model to optimize the service bias on the vector; and mitigating the bias within the new analytic engine service by cascading classifications through the new analytic engine service and then the compensator model.

17. The system of claim 16, embodied in a cloud-computing environment.

18. The computer-implemented method of claim 1, wherein the statistical aggregation is a measurement to determine the bias, the statistical aggregation being measured based on the true labels to two or more inputs and their corresponding service responded labels.

19. The computer-implemented method of claim 1, wherein the statistical aggregation is a measurement to determine the bias, the statistical aggregation being measured based discrepancies of the true labels to two or more inputs and their corresponding service responded labels.

* * * * *